US012674892B2

(12) United States Patent
Inukai et al.

(10) Patent No.: US 12,674,892 B2
(45) Date of Patent: Jul. 7, 2026

(54) ELECTROMAGNETIC-WAVE DETECTION APPARATUS AND DISTANCE-MEASUREMENT APPARATUS

(71) Applicant: KYOCERA Corporation, Kyoto (JP)

(72) Inventors: Tsuneyasu Inukai, Ogaki (JP); Hiroki Okada, Machida (JP)

(73) Assignee: KYOCERA Corporation, Kyoto (JP)

( * ) Notice: Subject to any disclaimer, the term of this patent is extended or adjusted under 35 U.S.C. 154(b) by 889 days.

(21) Appl. No.: 17/999,349

(22) PCT Filed: May 7, 2021

(86) PCT No.: PCT/JP2021/017575
§ 371 (c)(1),
(2) Date: Nov. 18, 2022

(87) PCT Pub. No.: WO2021/235249
PCT Pub. Date: Nov. 25, 2021

(65) Prior Publication Data
US 2023/0184951 A1 Jun. 15, 2023

(30) Foreign Application Priority Data
May 21, 2020 (JP) ................................. 2020-089145

(51) Int. Cl.
*G01S 17/89* (2020.01)
*G01S 7/481* (2006.01)
*G01S 17/931* (2020.01)

(52) U.S. Cl.
CPC ............ *G01S 17/89* (2013.01); *G01S 7/4817* (2013.01); *G01S 17/931* (2020.01)

(58) Field of Classification Search
CPC ........ G01S 17/86; G01S 17/58; G01S 7/4815; G01S 7/4863; G01S 7/4865; G01S 17/66; G01S 17/894; G01S 7/4816; G01S 17/931
See application file for complete search history.

(56) References Cited

U.S. PATENT DOCUMENTS

| | | | |
|---|---|---|---|
| 10,838,044 B2 | 11/2020 | Okada et al. | |
| 2008/0063239 A1* | 3/2008 | Macneille | G06V 10/145 |
| | | | 382/104 |

(Continued)

FOREIGN PATENT DOCUMENTS

| | | |
|---|---|---|
| CN | 101416024 A | 4/2009 |
| JP | 2018-200927 A | 12/2018 |

(Continued)

*Primary Examiner* — Dominic J Bologna
(74) *Attorney, Agent, or Firm* — Studebaker Brackett PLLC

(57) ABSTRACT
Provided is an electromagnetic-wave detection apparatus and a distance-measurement apparatus that reduces the difference between the timing of image acquisition and the timing of electromagnetic wave detection. An electromagnetic-wave detection apparatus (10) includes an image-information acquisition unit (141) that acquires image information of a space in which an object (ob) is present, an outline detection unit (142) that detects an outline of the object included in the image information, a radiation system (111) that radiates an electromagnetic wave into the space, a radiation control unit (143) that controls the radiation system such that the radiation system radiates the electromagnetic wave in a direction corresponding to the outline of the object in the space, and a first detection unit (20) that detects a reflected wave that is the electromagnetic wave reflected by the object.

10 Claims, 8 Drawing Sheets

(56)    References Cited

U.S. PATENT DOCUMENTS

| | | | | |
|---|---|---|---|---|
| 2010/0134596 A1* | 6/2010 | Becker | .................... | G01S 17/86 |
| | | | | 348/47 |
| 2018/0267556 A1* | 9/2018 | Templeton | ........... | G05D 1/0246 |
| 2018/0348344 A1* | 12/2018 | Wyrwas | ................ | G01S 7/4816 |
| 2020/0003893 A1* | 1/2020 | Okada | ................... | G01S 7/4816 |
| 2020/0096616 A1* | 3/2020 | Okada | ................... | G01S 7/4865 |
| 2020/0174101 A1* | 6/2020 | Uchida | ............. | G02B 26/0833 |

FOREIGN PATENT DOCUMENTS

| | | | | | |
|---|---|---|---|---|---|
| JP | | 6640149 B2 * | 2/2020 | ........... | G01S 7/4816 |
| JP | | 6754706 B2 * | 9/2020 | ........... | G01J 5/0814 |
| JP | | 6850173 B2 * | 3/2021 | ............. | G01S 7/484 |

* cited by examiner

ELECTROMAGNETIC-WAVE DETECTION APPARATUS AND DISTANCE-MEASUREMENT APPARATUS

CROSS-REFERENCE TO RELATED APPLICATIONS

The present application claims the priority of Japanese Patent Application No. 2020-089145 filed on May 21, 2020, the disclosure of which is hereby incorporated by reference in its entirety.

TECHNICAL FIELD

The present disclosure relates to an electromagnetic-wave detection apparatus and a distance-measurement apparatus.

BACKGROUND OF INVENTION

In recent years, an apparatus that acquires information relating to surroundings from detection results obtained by a plurality of detectors that detect electromagnetic waves has been developed. For example, there is known an electromagnetic-wave detection apparatus that reduces a difference between coordinate systems in detection results obtained by detectors (see Patent Literature 1).

CITATION LIST

Patent Literature

Patent Literature 1: Japanese Unexamined Patent Application Publication No. 2018-200927

SUMMARY

In a first aspect of the present disclosure, an electromagnetic-wave detection apparatus includes an image-information acquisition unit, an outline detection unit, a radiation system, a radiation control unit, and a first detection unit. The image-information acquisition unit that acquires image information of a space in which an object is present. The outline detection unit that detects an outline of the object included in the image information. The radiation system that radiates an electromagnetic wave into the space. The radiation control unit that controls the radiation system such that the radiation system radiates the electromagnetic wave in a direction corresponding to the outline of the object in the space. The first detection unit that detects a reflected wave that is the electromagnetic wave reflected by the object.

In a second aspect of the present disclosure, a distance-measurement apparatus includes an image-information acquisition unit, an outline detection unit, a radiation system, a radiation control unit, a first detection unit, and a calculation unit. The image-information acquisition unit that acquires image information of a space in which an object is present. The outline detection unit that detects an outline of the object included in the image information. The radiation system that radiates an electromagnetic wave into the space. The radiation control unit that controls the radiation system such that the radiation system radiates the electromagnetic wave in a direction corresponding to the outline of the object in the space. The first detection unit that detects a reflected wave that is the electromagnetic wave reflected by the object. The calculation unit that calculates a distance to the object based on detection information obtained by the first detection unit.

BRIEF DESCRIPTION OF THE DRAWINGS

FIG. 3 is a timing chart illustrating calculation of a distance.

FIG. 7 is a diagram illustrating timings of image information output, outline detection, and radiation control.

DESCRIPTION OF EMBODIMENTS

Figure 1:
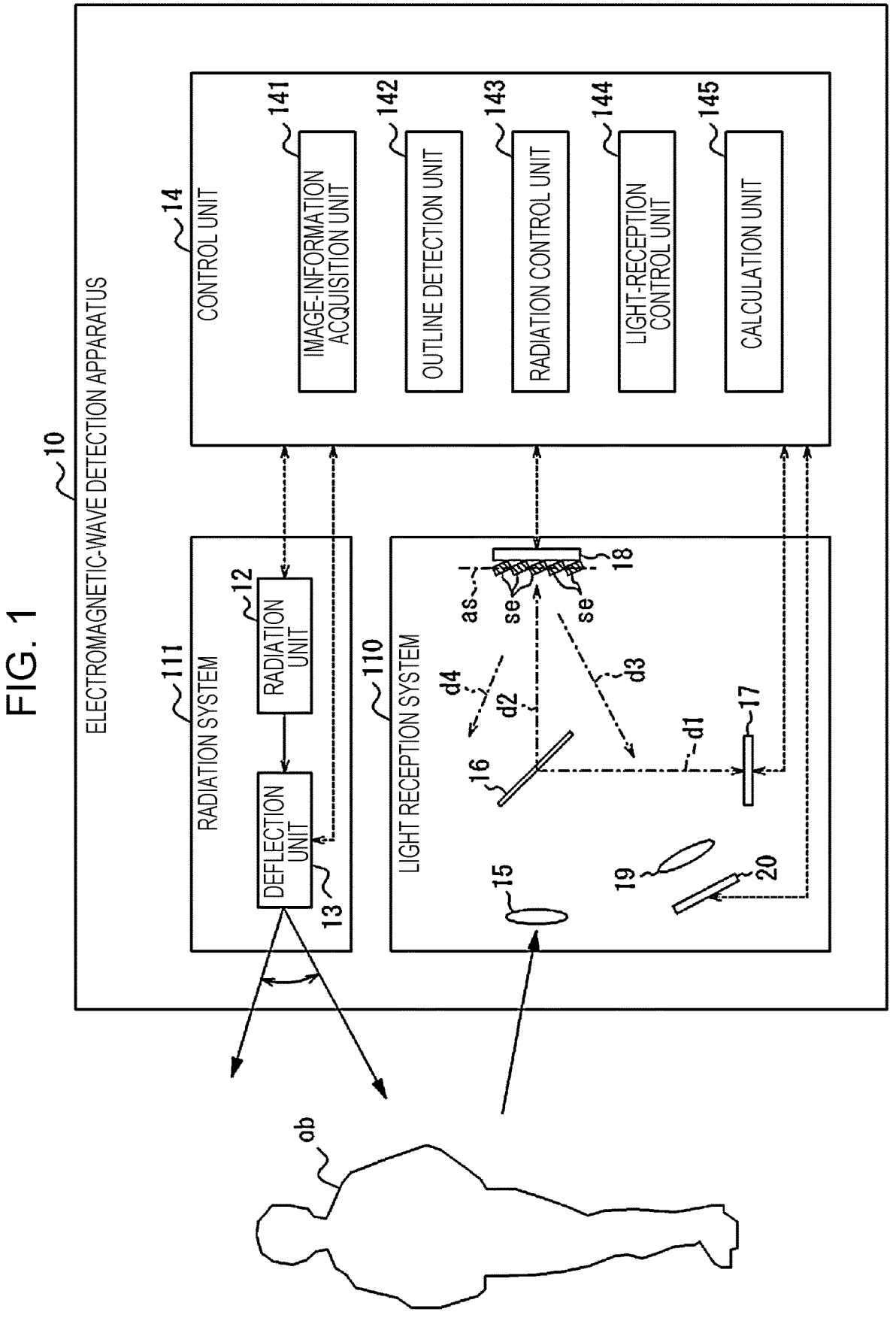
FIG. 1 is a diagram illustrating a schematic configuration of an electromagnetic-wave detection apparatus according to an embodiment.

FIG. 1 is a diagram illustrating a schematic configuration of an electromagnetic-wave detection apparatus 10 according to an embodiment. The electromagnetic-wave detection apparatus 10 includes a radiation system 111, a light reception system 110, and a control unit 14. In the present embodiment, although the electromagnetic-wave detection apparatus 10 includes the single radiation system 111 and the single light reception system 110, the electromagnetic-wave detection apparatus 10 is not limited to having the single radiation system 111 and the single light reception system 110, and the electromagnetic-wave detection apparatus 10 may have a configuration in which multiple light reception systems 110 each correspond to a respective one of multiple radiation systems 111.

The radiation system 111 includes a radiation unit 12 and a deflection unit 13. The light reception system 110 includes an incident unit 15, a split unit 16, a first detection unit 20, a second detection unit 17, a switching unit 18, and a first subsequent-stage optical system 19. The control unit 14 includes an image-information acquisition unit 141, an outline detection unit 142, a radiation control unit 143, a light-reception control unit 144, and a calculation unit 145. Details of each functional block of the electromagnetic-wave detection apparatus 10 according to the present embodiment will be described later.

In the drawings, dashed lines connecting the functional blocks each indicate a flow of a control signal or information that is transmitted and received. Each of the communications indicated by the dashed lines may be wired communication or may be wireless communication. In the drawings, solid arrows each indicate an electromagnetic wave in the form of a beam, and an object ob is a subject of the electromagnetic-wave detection apparatus 10. The subject may include, for example, objects such as a road, a median strip, a sidewalk, a roadside tree, and a vehicle and may include a person. There may be one or more objects ob.

The electromagnetic-wave detection apparatus 10 obtains an image including the subject and is capable of identifying the subject by detecting a reflected wave reflected by the subject. For example, the electromagnetic-wave detection apparatus 10 may be a driver-assistance device that is installed in a vehicle or the like and that detects the object ob approached the vehicle while the vehicle is running and notifies a driver of the object ob. In the present embodiment, the electromagnetic-wave detection apparatus 10 includes the calculation unit 145, and as will be described later, the electromagnetic-wave detection apparatus 10 functions as a distance-measurement apparatus that measures the distance from the electromagnetic-wave detection apparatus 10 to the object ob by using the calculation unit 145.

(Radiation System)

The radiation system 111 radiates an electromagnetic wave into a space in which the object ob is present. In the present embodiment, the radiation system 111 radiates an electromagnetic wave radiated by the radiation unit 12 toward the space in which the object ob is present via the deflection unit 13. As another example, the radiation system 111 may have a configuration in which the radiation unit 12 directly radiates the electromagnetic wave toward the object ob.

The radiation unit 12 radiates at least one of an infrared ray, a visible light ray, an ultraviolet ray, and a radio wave. In the present embodiment, the radiation unit 12 radiates an infrared ray. In addition, in the present embodiment, the radiation unit 12 radiates an electromagnetic wave in the form of a narrow beam of, for example, 0.5 degrees. The radiation unit 12 radiates the electromagnetic wave in pulses. The radiation unit 12 may include, for example, a light emitting diode (LED) as an electromagnetic-wave radiation element. Alternatively, the radiation unit 12 may include, for example, a laser diode (LD) as an electromagnetic-wave radiation element. The radiation unit 12 is switched to perform radiation of the electromagnetic wave and to stop radiation of the electromagnetic wave under control of the control unit 14. Here, the radiation unit 12 may form an LED array or an LD array that includes multiple electromagnetic-wave radiation elements arranged in an array and may radiate multiple beams simultaneously.

The deflection unit 13 causes the electromagnetic wave radiated by the radiation unit 12 to be output in different directions so as to change an irradiation position of the electromagnetic wave, which is radiated into the space in which the object ob is present. The deflection unit 13 may output the electromagnetic wave in different directions by reflecting the electromagnetic wave from the radiation unit 12 while changing its orientation. For example, the deflection unit 13 causes the electromagnetic wave to scan the object ob in a one-dimensional direction or a two-dimensional direction. Here, in the case where the radiation unit 12 is configured as, for example, an LD array, the deflection unit 13 reflects all the multiple beams that are output by the LD array so as to cause them to be output in the same direction. In other words, the radiation system 111 includes the single deflection unit 13 for the radiation unit 12 that includes one or more electromagnetic-wave radiation elements.

The deflection unit 13 is configured such that at least a portion of an irradiation region that is a space to which the electromagnetic wave is output is included in an electromagnetic-wave detection range of the light reception system 110. Thus, at least part of the electromagnetic wave, which is radiated into the space in which the object ob is present via the deflection unit 13, is reflected by at least a portion of the object ob and may be detected by the light reception system 110. Here, the electromagnetic wave that is output by the deflection unit 13 and reflected by at least a portion of the object ob will hereinafter be referred to as a reflected wave.

The deflection unit 13 includes, for example, a micro-electromechanical systems (MEMS) mirror, a polygon mirror, and a galvanometer mirror. In the present embodiment, the deflection unit 13 includes a MEMS mirror.

The deflection unit 13 changes a direction in which the deflection unit 13 reflects the electromagnetic wave under control of the control unit 14. The deflection unit 13 may include an angle sensor such as, for example, an encoder and may notify the control unit 14 of an angle that is detected by the angle sensor as direction information regarding a direction in which the electromagnetic wave is reflected. In such a configuration, the control unit 14 may calculate the irradiation position of the electromagnetic wave on the basis of the direction information received from the deflection unit 13. The control unit 14 may also calculate the irradiation position on the basis of a drive signal that is input in order to cause the deflection unit 13 to change a direction in which the deflection unit 13 reflects the electromagnetic wave.

(Light Reception System)

In the following description, the phrase "electromagnetic waves including a reflected wave" refers to an electromagnetic wave that includes the reflected wave reflected by the object ob and that is incident on the light reception system 110. In other words, an electromagnetic wave that is incident on the light reception system 110 may sometimes be referred to as "electromagnetic waves including a reflected wave" in order to distinguish it from the electromagnetic wave radiated by the radiation system 111. The electromagnetic waves including a reflected wave include not only the reflected wave, which is the electromagnetic wave that is radiated by the radiation system 111 and reflected by the object ob, but also outside light, such as sunlight, and light that is outside light reflected by the object ob.

The incident unit 15 is an optical system that includes at least one optical element and forms an image of the object ob that is the subject. The optical element includes, for example, at least one selected from the group consisting of a lens, a mirror, a diaphragm, an optical filter, and the like.

The split unit 16 is disposed between the incident unit 15 and a first image-forming position that is a position where the incident unit 15 forms an image of the object ob spaced apart from the incident unit 15 by a predetermined distance. The split unit 16 splits the electromagnetic waves including a reflected wave in accordance with a wavelength in such a manner that each wave travels in a first direction d1 or a second direction d2.

In the present embodiment, the split unit 16 allows part of electromagnetic waves including a reflected wave to pass therethrough in the first direction d1 and allows another part of the electromagnetic waves including a reflected wave to pass therethrough in the second direction d2. In the present embodiment, the split unit 16 reflects, in the first direction d1, visible light that is included in the electromagnetic waves incident on the split unit 16 and that is environmental light such as sunlight reflected by the object ob. The split unit 16 allows the infrared ray that is included in the electromagnetic waves incident thereon and that is radiated by the radiation unit 12 and reflected by the object ob to pass therethrough in the second direction d2. As another example, the split unit 16 may allow part of the electromagnetic waves, which are incident on the split unit 16, to pass therethrough in the first direction d1 and may allow another part of the electromagnetic waves to pass therethrough in the second direction d2. The split unit 16 may refract part of the electromagnetic waves, which are incident on the split unit 16, in the first direction d1 and may refract another part of the electromagnetic waves in the second direction d2. The split unit 16 is, for example, a half mirror, a beam splitter, a dichroic mirror, a cold mirror, a hot mirror, a metasurface, a deflection element, a prism, and the like.

The second detection unit 17 is disposed on a path of an electromagnetic wave that travels in the first direction d1 from the split unit 16. The second detection unit 17 is disposed at an image-forming position where an image of the object ob is formed in the first direction d1 or in the vicinity of this image-forming position. The second detection unit 17 detects an electromagnetic wave that has travelled in the first direction d1 from the split unit 16.

The second detection unit 17 may be disposed with respect to the split unit 16 in such a manner that a first travelling axis of the electromagnetic wave that travels in the first direction d1 from the split unit 16 is parallel to a first detection axis of the second detection unit 17. The first travelling axis is the central axis of an electromagnetic wave that travels in the first direction d1 from the split unit 16 and that propagates while spreading radially. In the present embodiment, the first travelling axis is an axis that is obtained by extending an optical axis of the incident unit 15 to the split unit 16 and bending the optical axis at the split unit 16 to make it parallel to the first direction d1. The first detection axis is an axis that passes through the center of a detection surface of the second detection unit 17 and that is perpendicular to the detection surface.

The second detection unit 17 may be disposed in such a manner that the gap between the first travelling axis and the first detection axis is equal to or less than a first gap threshold. The second detection unit 17 may be disposed in such a manner that the first travelling axis and the first detection axis coincide with each other. In the present embodiment, the second detection unit 17 is disposed in such a manner that the first travelling axis and the first detection axis coincide with each other.

The second detection unit 17 may be disposed with respect to the split unit 16 such that a first angle formed by the first travelling axis and the detection surface of the second detection unit 17 is equal to or less than a first-angle threshold or such that the first angle is the same as a predetermined angle. In the present embodiment, the second detection unit 17 is disposed in such a manner that the first angle is 90 degrees.

In the present embodiment, the second detection unit 17 is a passive sensor. Specifically, in the present embodiment, the second detection unit 17 includes an element array. For example, the second detection unit 17 includes an imaging device such as an image sensor or an imaging array and captures an image that is formed by an electromagnetic wave focused at the detection surface so as to generate image information of a space including the captured object ob.

More specifically, in the present embodiment, the second detection unit 17 captures a visible-light image. The second detection unit 17 transmits the generated image information as a signal to the control unit 14. The second detection unit 17 may capture images, which are an infrared-ray image, an ultraviolet-ray image, a radio-wave image, and the like, other than a visible-light image.

The switching unit 18 is disposed on a path of an electromagnetic wave that travels in the second direction d2 from the split unit 16. The switching unit 18 is disposed at the first image-forming position at which an image of the object ob is formed in the second direction d2 or in the vicinity of the first image-forming position.

In the present embodiment, the switching unit 18 is disposed at the image-forming position. The switching unit

18 has an action surface as on which an electromagnetic wave that has passed through the incident unit 15 and the split unit 16 is incident. The action surface as includes multiple switching elements se arranged two-dimensionally. The action surface as is a surface that causes an action such as, for example, reflection of an electromagnetic wave and transmission of an electromagnetic wave in at least one of a first state and a second state, which are described below.

The switching unit 18 can switch the state of each of the switching elements se between the first state in which the switching element se causes an electromagnetic wave that is incident on the action surface as to travel in a third direction d3 and the second state in which the switching element se causes an electromagnetic wave that is incident on the action surface as to travel in a fourth direction d4. In the present embodiment, the first state is a first reflective state in which an electromagnetic wave that is incident on the action surface as is reflected in the third direction d3. The second state is a second reflective state in which an electromagnetic wave that is incident on the action surface as is reflected in the fourth direction d4.

More specifically, in the present embodiment, each of the switching elements se of the switching unit 18 has a reflective surface at which an electromagnetic wave is reflected. The switching unit 18 switches the state of each of the switching elements se between the first reflective state and the second reflective state by arbitrarily changing the orientation of the reflective surface of each of the switching elements se.

In the present embodiment, the switching unit 18 includes, for example, a digital micro-mirror device (DMD). The DMD can switch the state of the reflective surface of each of the switching elements se between a state in which the reflective surface is inclined at +12 degrees with respect to the action surface as and a state in which the reflective surface is inclined at −12 degrees with respect to the action surface as by driving a micro-reflective surface included in the action surface as. The action surface as is parallel to a plate surface of a substrate of the DMD on which the micro-reflective surface is placed.

Figure 2:
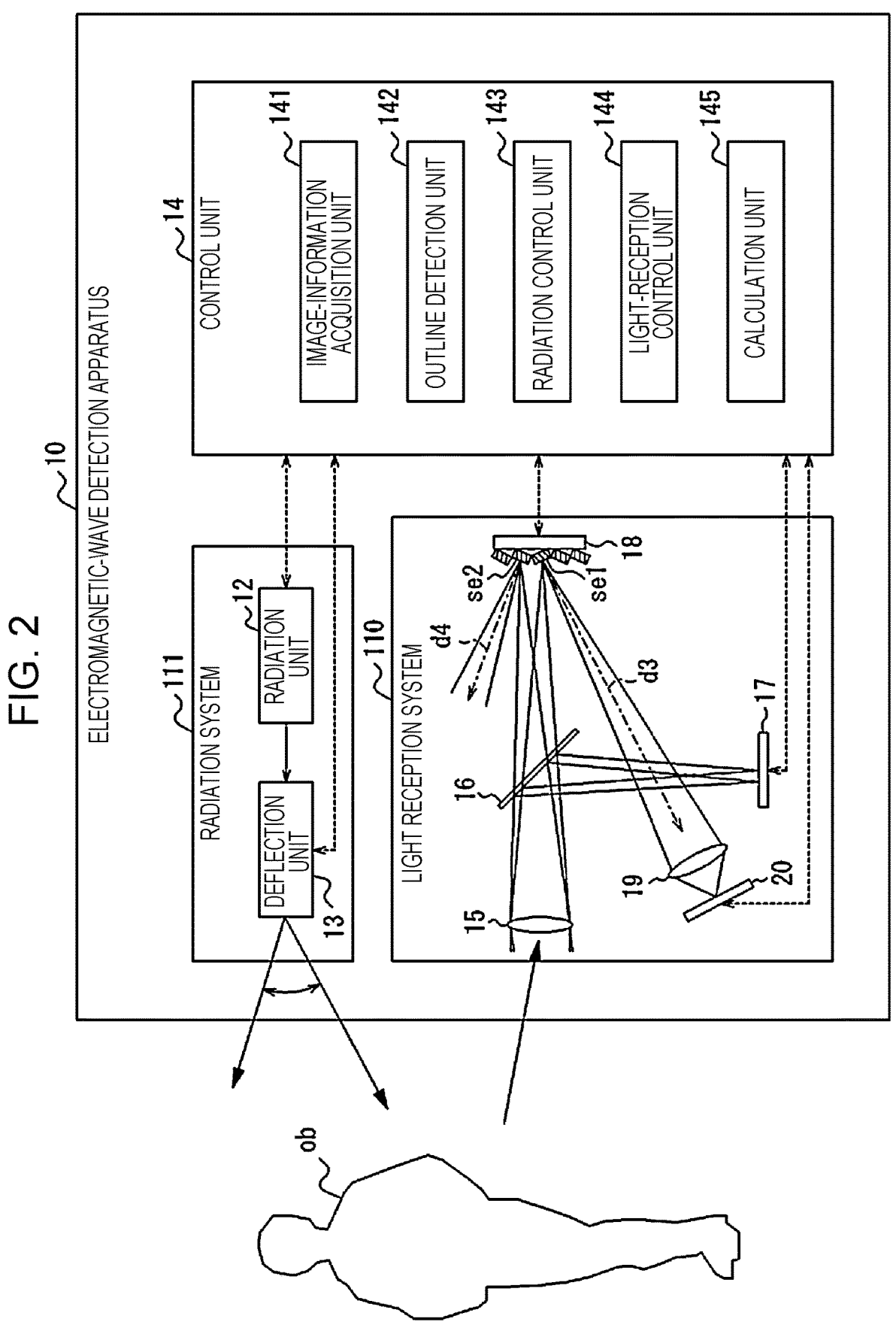
FIG. 2 is a diagram illustrating a travelling direction of an electromagnetic wave in a first state and a second state in the electromagnetic-wave detection apparatus illustrated in FIG. 1.

The switching unit 18 switches the state of each of the switching elements se between the first state and the second state under control of the control unit 14. As illustrated in FIG. 2, for example, the switching unit 18 may cause an electromagnetic wave that is incident on switching elements se1, which are some of the switching elements se, to travel in the third direction d3 by switching the states of the switching elements se1 to the first state and simultaneously may cause an electromagnetic wave that is incident on a switching element se2, which is one of the switching elements se and which is different from the switching elements se1, to travel in the fourth direction d4 by switching the state of the switching elements se2 to the second state. More specifically, the control unit 14 detects a radiation direction of an electromagnetic wave or an irradiation position of the electromagnetic wave on the basis of direction information received from the deflection unit 13. Then, the control unit 14 brings one of the switching elements se1 that corresponds to the detected radiation direction of the electromagnetic wave or the detected irradiation position of the electromagnetic wave into the first state and brings the rest of the switching elements se1 into the second state so as to selectively cause a reflected wave from the object ob to travel in the third direction d3. An electromagnetic wave that is one of the electromagnetic waves that have passed through the split unit 16 and that is not a reflected wave from the object ob travels in the fourth direction d4, and thus, this electromagnetic wave will not be incident on the first detection unit 20.

As illustrated in FIG. 1, the first subsequent-stage optical system 19 is disposed in the third direction d3 from the switching unit 18. The first subsequent-stage optical system 19 includes, for example, at least one of a lens and a mirror. The first subsequent-stage optical system 19 forms an image of the object ob as an electromagnetic wave whose travelling direction has been switched by the switching unit 18.

The first detection unit 20 detects a reflected wave. The first detection unit 20 is disposed at a position at which the first detection unit 20 can detect an electromagnetic wave that is caused by the switching unit 18 to travel in the third direction d3 and then to further travel through the first subsequent-stage optical system 19. The first detection unit 20 detects an electromagnetic wave that has passed through the first subsequent-stage optical system 19, that is, an electromagnetic wave that has travelled in the third direction d3, and outputs a detection signal.

The first detection unit 20 may be arranged, with the switching unit 18, with respect to the split unit 16 such that the travelling direction of an electromagnetic wave travelling in the second direction d2 from the split unit 16 is switched to the third direction d3 by the switching unit 18 and such that a second travelling axis of the electromagnetic wave is parallel to a second detection axis of the first detection unit 20. The second travelling axis is the central axis of an electromagnetic wave that travels in the third direction d3 from the switching unit 18 and that propagates while spreading radially. In the present embodiment, the second travelling axis is an axis that is obtained by extending the optical axis of the incident unit 15 to the switching unit 18 and bending the optical axis at the switching unit 18 to make it parallel to the third direction d3. The second detection axis is an axis that passes through the center of a detection surface of the first detection unit 20 and that is perpendicular to the detection surface.

The first detection unit 20 may be arranged with the switching unit 18 in such a manner that the gap between the second travelling axis and the second detection axis is equal to or less than a second gap threshold. The second gap threshold may be the same as or different from the first gap threshold. The first detection unit 20 may be disposed in such a manner that the second travelling axis of and the second detection axis coincide with each other. In the present embodiment, the first detection unit 20 is disposed in such a manner that the second travelling axis and the second detection axis coincide with each other.

The first detection unit 20 may be arranged, with the switching unit 18, with respect to the split unit 16 such that a second angle formed by the second travelling axis and the detection surface of the first detection unit 20 is equal to or less than a second-angle threshold or such that the second angle is the same as a predetermined angle. The second-angle threshold may be the same as or different from the first-angle threshold. In the present embodiment, the first detection unit 20 is disposed in such a manner that the second angle is 90 degrees as mentioned above.

In the present embodiment, the first detection unit 20 is an active sensor that detects a reflected wave of an electromagnetic wave radiated from the radiation unit 12 toward the object ob. The first detection unit 20 includes, for example, a single element, and examples of the single element are an avalanche photodiode (APD), a photodiode (PD), a distance-measurement image sensor, and the like. The first detection unit 20 may include an element array, and examples of the element array are an APD array, a PD array, a distance-measurement imaging array, a distance-measurement image sensor, and the like.

In the present embodiment, the first detection unit 20 transmits, as a signal, detection information that indicates that a reflected wave from a subject has been detected to the control unit 14. More specifically, the first detection unit 20 detects an electromagnetic wave in an infrared band.

In the present embodiment, the first detection unit 20 is used as a detection element for measuring a distance to the object ob. In other words, the first detection unit 20 is an element included in a distance-measurement sensor, and an image of the object ob is not necessarily formed at the detection surface of the first detection unit 20 as long as the first detection unit 20 can detect an electromagnetic wave. Thus, the first detection unit 20 does not need to be disposed at a second image-forming position that is a position where the first subsequent-stage optical system 19 forms an image of the object ob. That is to say, in this configuration, the first detection unit 20 may be disposed at any position on a path of an electromagnetic wave that travels through the first subsequent-stage optical system 19 after being caused by the switching unit 18 to travel in the third direction d3 as long as the first detection unit 20 is disposed at a position where an electromagnetic wave can be incident on the detection surface from all angles of view.

The electromagnetic-wave detection apparatus 10 has a configuration such as that described above, so that the electromagnetic-wave detection apparatus 10 matches a predetermined position on an image with the optical axis of a reflected wave for measuring a distance to the predetermined position.

(Control Unit)

The image-information acquisition unit 141 acquires image information of the space in which the object ob is present from the second detection unit 17. More specifically, the image-information acquisition unit 141 includes a line buffer that temporarily stores image information for several lines and outputs the image information to the outline detection unit 142. The line buffer includes, for example, a semiconductor memory, a magnetic memory, or the like.

The outline detection unit 142 detects an outline of the object ob included in image information received from the image-information acquisition unit 141. The outline detection unit 142 may detect an outline of the object ob in a one-dimensional direction or a two-dimensional direction. The outline detection unit 142 may employ, for example, the Laplacian method, the Sobel method the Canny method, or the like. The method of detecting the outline is not limited.

The radiation control unit 143 controls the radiation system 111. For example, the radiation control unit 143 causes the radiation unit 12 to be switched to perform radiation of an electromagnetic wave and to stop radiation of the electromagnetic wave. For example, the radiation control unit 143 causes the deflection unit 13 to change a direction in which the deflection unit 13 reflects an electromagnetic wave. As will be described in detail later, the radiation control unit 143 performs control in such a manner that the radiation system 111 radiates an electromagnetic wave in a direction corresponding to the outline of the object ob in the space on the basis of the information of the outline of the object ob detected by the outline detection unit 142.

The light-reception control unit 144 controls the light reception system 110. For example, the light-reception control unit 144 causes the switching unit 18 to switch the state of each of the switching elements se between the first state and the second state.

The calculation unit 145 calculates a distance to the object ob on the basis of detection information received from the first detection unit 20. The calculation unit 145 can calculate the distance by, for example, the time-of-flight (ToF) method on the basis of the received detection information.

Figure 3:
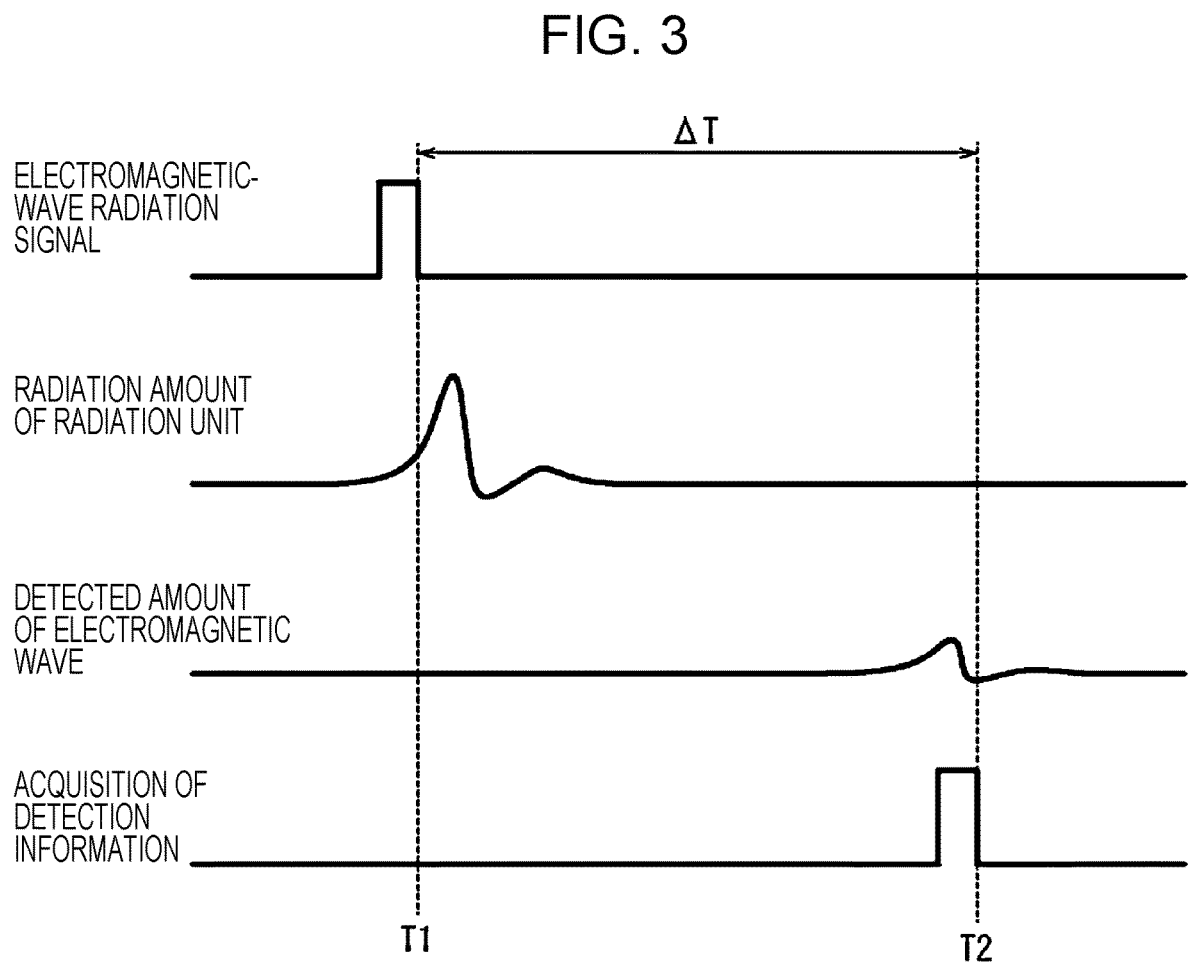

As illustrated in FIG. 3, the control unit 14 inputs an electromagnetic-wave radiation signal to the radiation unit 12 so as to cause the radiation unit 12 to radiate a pulsed electromagnetic wave (see the "electromagnetic-wave radiation signal" field). The radiation unit 12 radiates an electromagnetic wave on the basis of the input electromagnetic-wave radiation signal (see the "radiation amount of radiation unit" field). The electromagnetic wave that is radiated by the radiation unit 12 and reflected by the deflection unit 13 so as to be radiated into an irradiation region that is the space in which the object ob is present is reflected in the irradiation region. The control unit 14 switches the state of at least one of the switching elements se in an image-forming region of the switching unit 18 in which a reflected wave, which is an electromagnetic wave reflected in the irradiation region, is focused by the incident unit 15 to the first state and switches the state of at least one of the rest of the switching elements se to the second state. Then, when the first detection unit 20 detects the electromagnetic wave reflected in the irradiation region (see the "detected amount of electromagnetic wave" field), the first detection unit 20 notifies the control unit 14 of detection information.

The calculation unit 145 acquires information regarding the above-mentioned signal including detection information. The calculation unit 145 includes, for example, a time measurement large scale integrated circuit (LSI) and measures a period of time ΔT from a timing T1 at which the radiation unit 12 is caused to radiate an electromagnetic wave to a timing T2 at which detection information is acquired (see the "acquisition of detection information" field). The calculation unit 145 calculates a distance to the irradiation position by multiplying the period of time ΔT by the speed of light and dividing it by two.

Here, the control unit 14 may include at least one processor. The processor may load a program from an accessible memory and operate as the image-information acquisition unit 141, the outline detection unit 142, the radiation control unit 143, the light-reception control unit 144, and the calculation unit 145. The processor may include at least one of a general-purpose processor that executes a specific function by loading a specific program and a dedicated processor for specific processing. The dedicated processor may include an application specific integrated circuit (ASIC). The processor may include a programmable logic device (PLD). The PLD may include a field-programmable gate array (FPGA). The control unit 14 may include at least one of a system-on-a-chip (SoC) in which one or more processors cooperate with each other and a system-in-a-package (SiP).

(Timing of Image Acquisition and Timing of Electromagnetic Wave Detection)

In the electromagnetic-wave detection apparatus 10 having the above-described configuration, the second detection unit 17 acquires an image including the object ob, which is the subject, and the first detection unit 20 detects a reflected wave, so that the distance from the electromagnetic-wave detection apparatus 10 to the object ob can be calculated. The time taken to detect electromagnetic waves including a reflected wave is generally longer than the time taken for an imaging device or the like to acquire an image of one frame. For example, 30 frames of images each having 1920×1080 pixels can be acquired per second by using an imaging device. In contrast, the time taken to measure the distance by receiving a reflected wave, which is part of the radiated electromagnetic wave, may sometimes be 20 μs for one point. Thus, in the related art in which the entire space is scanned by using a beam, when an electromagnetic wave is detected in accordance with the frame rate at which an imaging device acquires images, the resolution of electromagnetic wave detection becomes extremely low. For example, when detection of an electromagnetic wave is performed at 30 frames per second, only 54×31 points can be measured, and thus, distance measurement for the object ob cannot be performed properly. In the related art, if the resolution of electromagnetic wave detection is increased, the frame rate of distance measurement decreases, and the difference between the timing of image acquisition and the timing of electromagnetic wave detection becomes large. In the above-mentioned example, when electromagnetic wave detection is performed on 240×135 points, the frame rate of distance measurement is about 1.5, and there is a possibility that an electromagnetic wave will be detected in accordance with an image that is 20 or more frames older than the most recent image. In other words, 20 frames or more of images may be acquired by the imaging device during the period when distance measurement of one frame is performed by an electromagnetic-wave detection apparatus, so that the difference between the timing at which the most recent image is acquired and the timing at which the distance measurement is performed becomes large. In the present embodiment, as will be described below, the electromagnetic-wave detection apparatus 10 solves such a problem by causing the radiation system 111 to radiate an electromagnetic wave on the basis of information regarding the outline of the object ob so as to reduce the number of times per frame that an electromagnetic wave is radiated.

Figure 4:
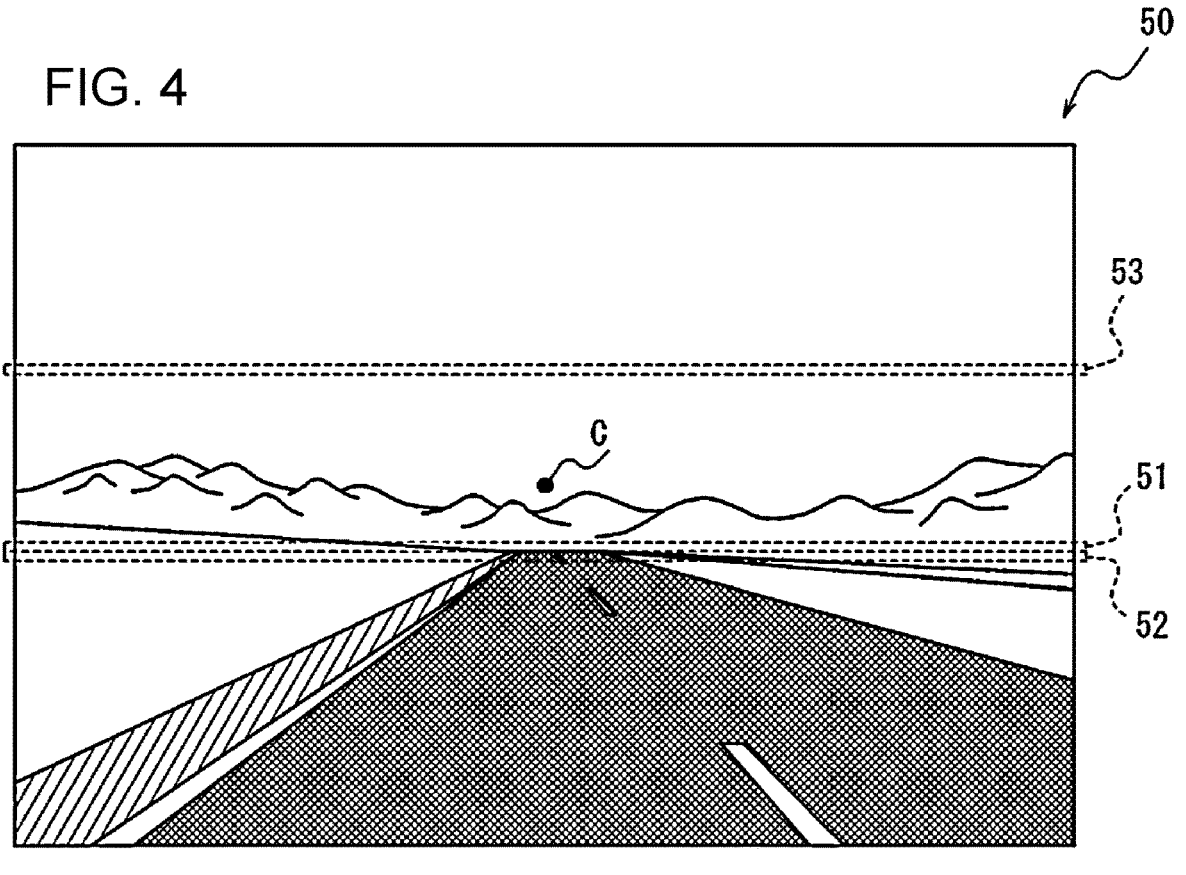
FIG. 4 is a diagram illustrating an example of an image of a space in which an object is present.

FIG. 4 is a diagram illustrating an example of the space in which the object ob is present. In the following description, the image illustrated in FIG. 4 will hereinafter sometimes be referred to as a captured image 50. The captured image 50 is one frame image and has a size of, for example, 1920×1080 pixels. In the captured image 50, the sky, each of the mountains, the road, the white lines, each of the side walls, and the median strip are the objects ob. The captured image 50 is an image of the area in front of a running vehicle in which the electromagnetic-wave detection apparatus 10 is installed, and a center C is set to be located ahead of the vehicle in the running direction of the vehicle.

The image-information acquisition unit 141 acquires an image signal of the captured image 50 from the second detection unit 17 on a line-by-line basis. In other words, the image-information acquisition unit 141 acquires image information of the space in which the objects ob are present not in units of frames, but in units of partial information. In the present embodiment, the image-information acquisition unit 141 includes a line buffer of eight lines and acquires partial information of eight lines as a unit. For example, the image-information acquisition unit 141 acquires first partial information 51 that is image information of a portion of the space and second partial information 52 that is different from the first partial information 51 and that is image information of another portion of the space. The first partial information 51 and the second partial information 52 are each partial information for eight lines. The line buffer of the image-information acquisition unit 141 acquires the first partial information 51, and then, the line buffer overwrites and acquires the second partial information 52. The image-information acquisition unit 141 outputs the first partial information 51 to the outline detection unit 142 and then outputs the second partial information 52.

Figure 5:
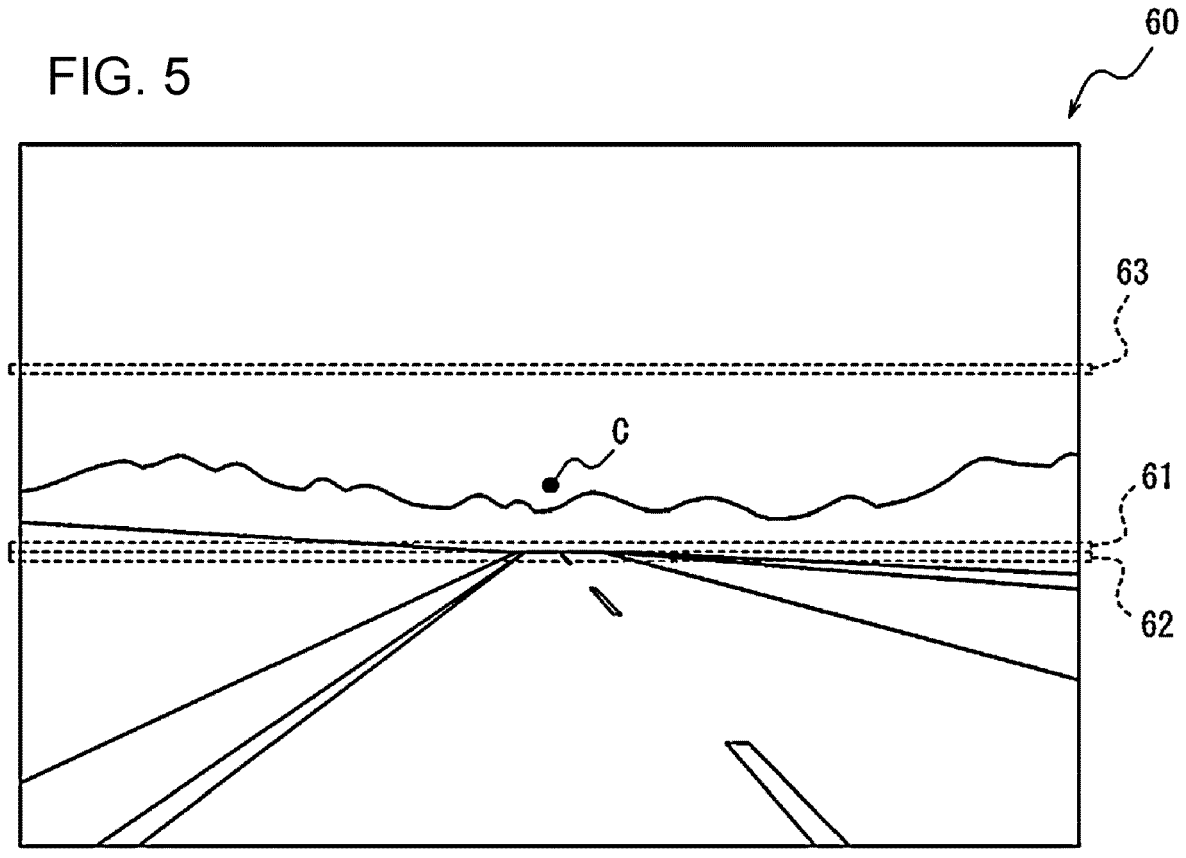
FIG. 5 is a diagram illustrating an outline of the image illustrated in FIG. 4.

FIG. 5 is a diagram illustrating the outline of the captured image 50 illustrated in FIG. 4. In the following description, the image illustrated in FIG. 5 will hereinafter sometimes be referred to as an outline image 60. The outline image 60 is obtained by converting a result of extraction of the outline of the captured image 50 performed by the outline detection unit 142 into an image. In the outline image 60, the boundaries between the objects ob, which are the sky, each of the mountains, the road, the white lines, each of the side walls, and the median strip, are extracted and illustrated. The position of the center C in the outline image 60 is the same as that in the captured image 50.

The outline detection unit 142 acquires an image signal of the captured image 50 from the image-information acquisition unit 141 on a line-by-line basis. The outline detection unit 142 can acquire an image signal within the capacity of the line buffer of the image-information acquisition unit 141. As in the present embodiment, the outline detection unit 142 may acquire partial information for each line, and each time the outline detection unit 142 acquires partial information, the outline detection unit 142 may perform outline detection on the acquired partial information for one line. As another example, the outline detection unit 142 may acquire, all at once, partial information for eight lines that can be stored in the line buffer of the image-information acquisition unit 141 and may perform the outline detection on the acquired partial information for eight lines. In the present embodiment, the outline detection unit 142 outputs outline information that corresponds to partial information for eight lines to the radiation control unit 143 as a unit. For example, the outline detection unit 142 detects, on the basis of the first partial information 51 for eight lines, a first outline in which the outlines of the objects ob are partially included and then detects, on the basis of the second partial information 52 for eight lines, a second outline in which the outlines of the objects ob are partially included. Subsequently, the outline detection unit 142 outputs first outline information 61 regarding the first outline to the radiation control unit 143 and then outputs second outline information 62 regarding the second outline to the radiation control unit 143.

Figure 6:
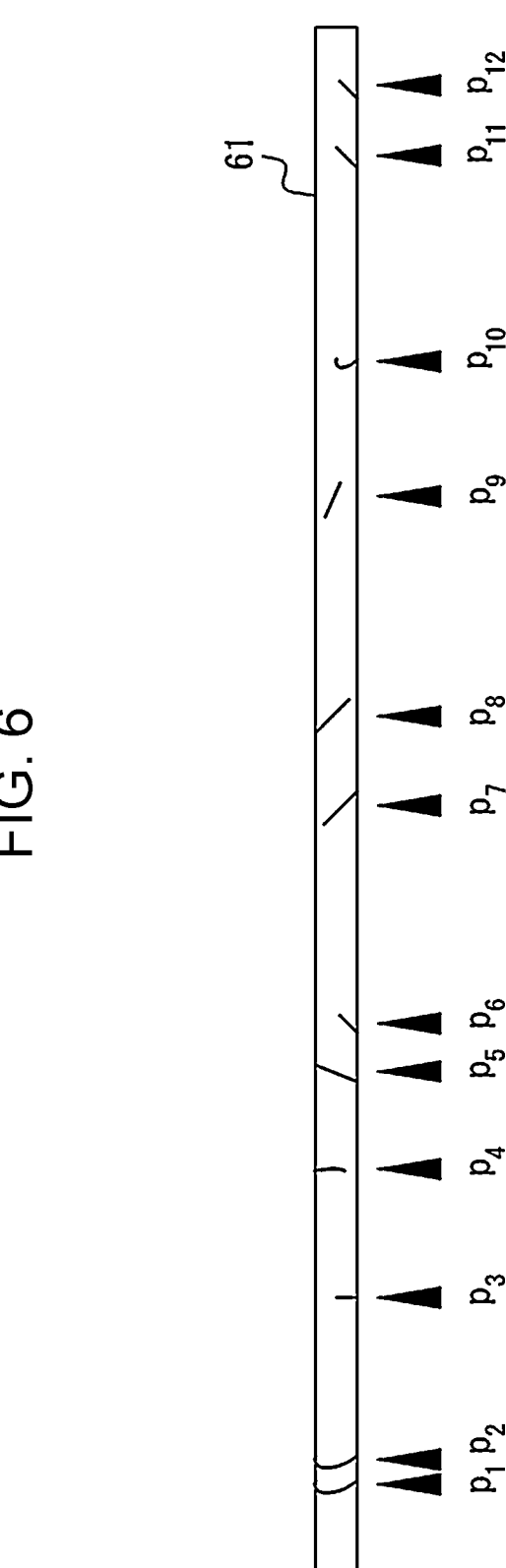
FIG. 6 is a diagram illustrating examples of irradiation positions of electromagnetic waves.

FIG. 6 is a diagram illustrating examples of irradiation positions of electromagnetic waves radiated by the radiation system 111. FIG. 6 illustrates the first outline information 61 in FIG. 5 in an enlarged manner. The 12 lines included in the first outline information 61 represent partial outlines of the objects ob included in the corresponding partial information. Upon acquisition of the first outline information 61, the radiation control unit 143 controls the radiation system 111 such that the radiation system 111 radiates electromagnetic waves in directions corresponding to the outlines of the objects ob in the space. In other words, when the radiation directions correspond to the outlines of the objects ob, the radiation control unit 143 causes the radiation system 111 to radiate pulsed electromagnetic waves, and when the radiation directions do not correspond to the outlines of the objects ob, the radiation control unit 143 controls the radiation system 111 such that the radiation system 111 moves to the next outline position instead of radiating electromagnetic waves. In the electromagnetic-wave detection apparatus 10, the optical axis of light for acquiring an image at a predetermined position in a space and the optical axis of a reflected wave for measuring a distance to the predetermined position coincide with each other, and thus, the electromagnetic waves can be accurately radiated in directions corresponding to the outlines of the objects ob.

Here, the outlines of the objects ob may each have a length in the horizontal or vertical direction. For example, the radiation control unit 143 may define the positions of midpoints of continuous outlines as outline positions $P_1$ to $P_{12}$ and may radiate electromagnetic waves in the directions corresponding to the outline positions $P_1$ to $P_{12}$ in the actual space. Similarly, upon acquisition of the second outline information 62, the radiation control unit 143 controls the radiation system 111 such that the radiation system 111 radiates electromagnetic waves in the directions corresponding to the outlines of the objects ob in the space. In other words, the radiation control unit 143 radiates the electromagnetic waves in the directions corresponding to the first outline in the space and then radiates the electromagnetic waves in the directions corresponding to the second outline in the space.

By radiating electromagnetic waves in the directions corresponding to the outline positions $P_1$ to $P_{12}$, the electromagnetic waves can be reliably radiated to the positions at which the objects ob whose desired to be measured are present. For example, if electromagnetic waves are radiated so as to be evenly spaced, at least one of the objects ob that is small and that is positioned between irradiated points may sometimes not be irradiated with any of the electromagnetic waves. In the present embodiment, the radiation system 111 radiates electromagnetic waves on the basis of information of the outlines of the objects ob, so that the electromagnetic-wave detection apparatus 10 can radiate the electromagnetic waves in the directions toward the objects ob with certainty.

An upper limit value that is the number of points at which the radiation system 111 can radiate an electromagnetic wave per frame may be determined on the basis of the time taken for the first detection unit 20 to detect a reflected wave. For example, when the second detection unit 17 detects 30 frames of images each having 1920×1080 pixels per second, partial information for eight lines that can be stored in the line buffer is detected in 240 μs. However, the time taken to detect an image for one line is set to 30 μs by taking into consideration a blanking interval. In contrast, the time taken for the first detection unit 20 to detect a reflected wave, which is part of a radiated electromagnetic wave, is 20 μs per point. The radiation system 111 radiates an electromagnetic wave in accordance with outline detection performed on partial information for eight lines. Accordingly, the upper limit in this case is 12, which is obtained by dividing 240 μs by 20 μs. The radiation control unit 143 controls the radiation system 111 such that the radiation system 111 changes a radiation direction to, for example, the horizontal direction and radiates an electromagnetic wave at points equal to or less than the upper limit. For example, the radiation system 111 may perform electromagnetic wave radiation at the upper limit while changing a radiation direction to one direction and may perform electromagnetic wave radiation at the upper limit while changing a radiation direction to another direction and then change it back to the original direction. As a specific example of the latter case, the radiation system 111 may deflect an electromagnetic wave such that the electromagnetic wave performs a single horizontal reciprocating motion in 240 μs, and the radiation system 111 may perform electromagnetic wave radiation at six points while the electromagnetic wave is deflected in one direction and may perform electromagnetic wave radiation at other six points while the electromagnetic wave is deflected in another direction.

Here, in the captured image 50, third partial information 53 is partial information regarding an image of the sky for eight lines. In the outline image 60, although third outline information 63 corresponds to the third partial information 53, the third outline information 63 includes no outline. For example, when the radiation control unit 143 acquires the third outline information 63, the radiation control unit 143 does not need to cause the radiation system 111 to radiate an electromagnetic wave. When the number of outlines included in an acquired outline information is less than the upper limit, the radiation control unit 143 may cause the radiation system 111 to radiate an electromagnetic wave at points less than the upper limit. In other words, the radiation control unit 143 may cause an electromagnetic wave to be radiated only in a direction corresponding to an outline in a space.

In the case where the number of outlines of the objects ob exceeds the upper limit, the radiation control unit 143 may cause electromagnetic waves to be radiated in directions corresponding to the higher-priority outlines of the objects ob, the number of the higher-priority outlines being equal to or less than the upper limit. For example, the priorities of the outlines of the objects ob may be set in such a manner that the outline of the object ob closest to the center C in the captured image 50 of the space has the highest priority. In other words, the priority of the object ob closer to the center C is higher than the priority of the object ob located in a peripheral portion of the captured image 50. As another example, the priorities may be set in such a manner that the clearer the outline, the higher the priority. In other words, a portion that is certainly a boundary between the objects ob may be preferentially detected. As another example, the priorities may be set in such a manner that the closer outline of the object ob has a higher priority. In other words, the near object ob against which an action for danger avoidance or the like needs to be taken immediately may be preferentially detected. As another example, the priorities may be set on the basis of the moving speed of a vehicle or the like in which the electromagnetic-wave detection apparatus 10 is installed. In other words, the distant object ob may have a higher priority when the moving speed is high, and the near object ob may have a higher priority when the moving speed is low. As another example, the priorities may be set on the basis of the types of the objects ob determined from a captured image, the sizes of the objects ob, and the moving speeds of the objects ob in a transverse direction.

Figure 7:
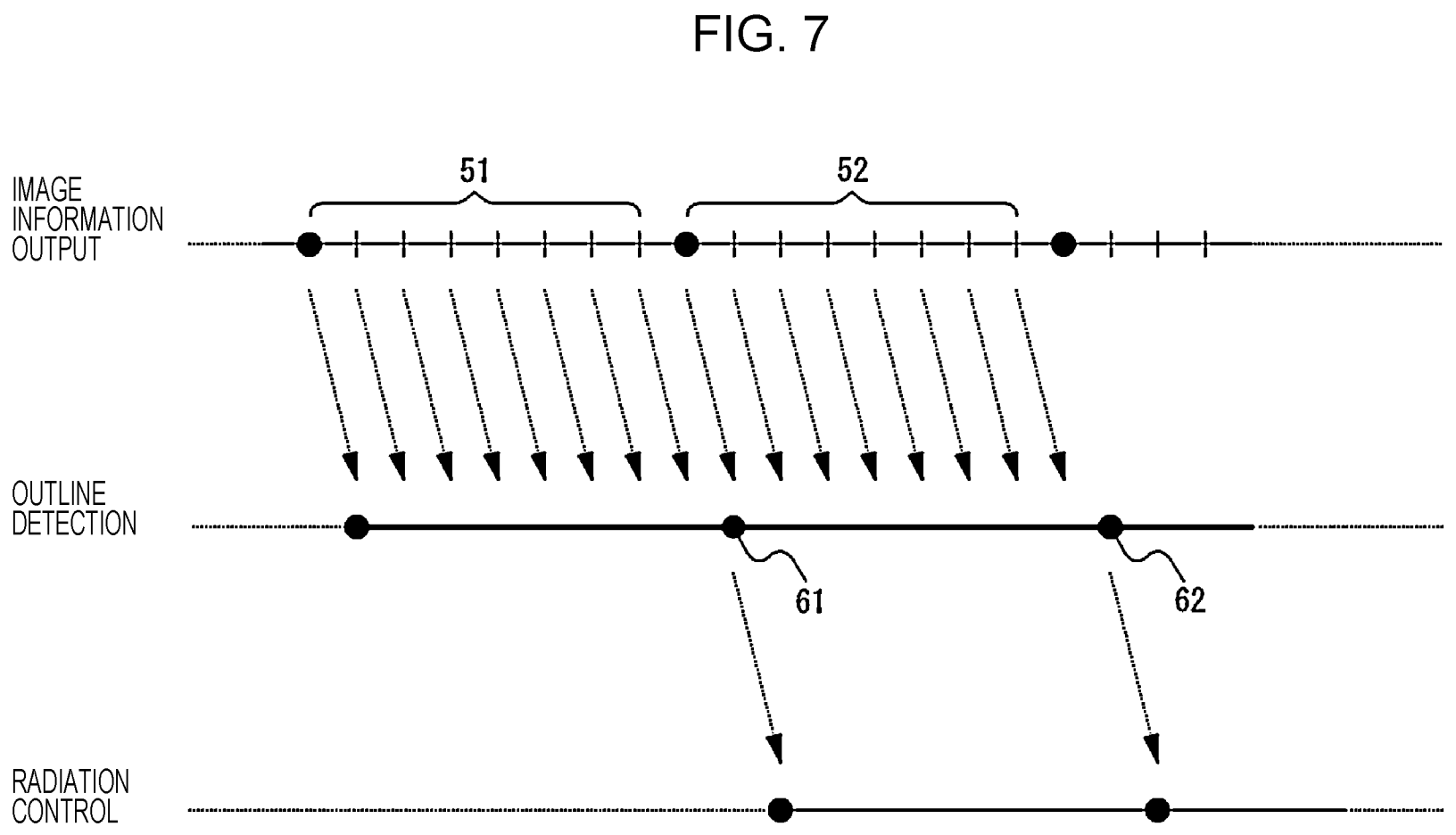

FIG. 7 is a diagram illustrating examples of timings of image information output, outline detection, and radiation control. The image-information acquisition unit 141 outputs partial information for eight lines (e.g., the first partial information 51) temporarily stored in the line buffer to the outline detection unit 142. In this case, the image-information acquisition unit 141 divides partial information for one line into eight pieces and outputs them to the outline detection unit 142 one piece at a time. The outline detection unit 142 performs outline detection each time it acquires partial information for one line. The outline detection unit 142 performs outline detection on the first partial information 51 and outputs the first outline information 61 to the radiation control unit 143. The radiation control unit 143 controls the radiation system 111 such that the radiation system 111 radiates an electromagnetic wave in a direction corresponding to the outline of the object ob in the space on the basis of the first outline information 61. In this case, the image-information acquisition unit 141 outputs partial information for eight lines (e.g., the second partial information 52) temporarily stored in the line buffer to the outline detection unit 142. The outline detection unit 142 performs outline detection on the second partial information 52 and outputs the second outline information 62 to the radiation control unit 143. The radiation control unit 143 controls the radiation system 111 such that the radiation system 111 radiates an electromagnetic wave in a direction corresponding to the outline of the object ob in the space on the basis of the second outline information 62. In this manner, the image-information acquisition unit 141, the outline detection unit 142, and the radiation control unit 143 perform processing in parallel in units of partial information, which is part of image information. In this case, the delay that is the period from when an image is acquired until the radiation system 11 radiates an electromagnetic wave includes the delay in storing partial information in the line buffer and the delay due to the outline detection processing.

(Method of Detecting Electromagnetic Wave)

Figure 8:
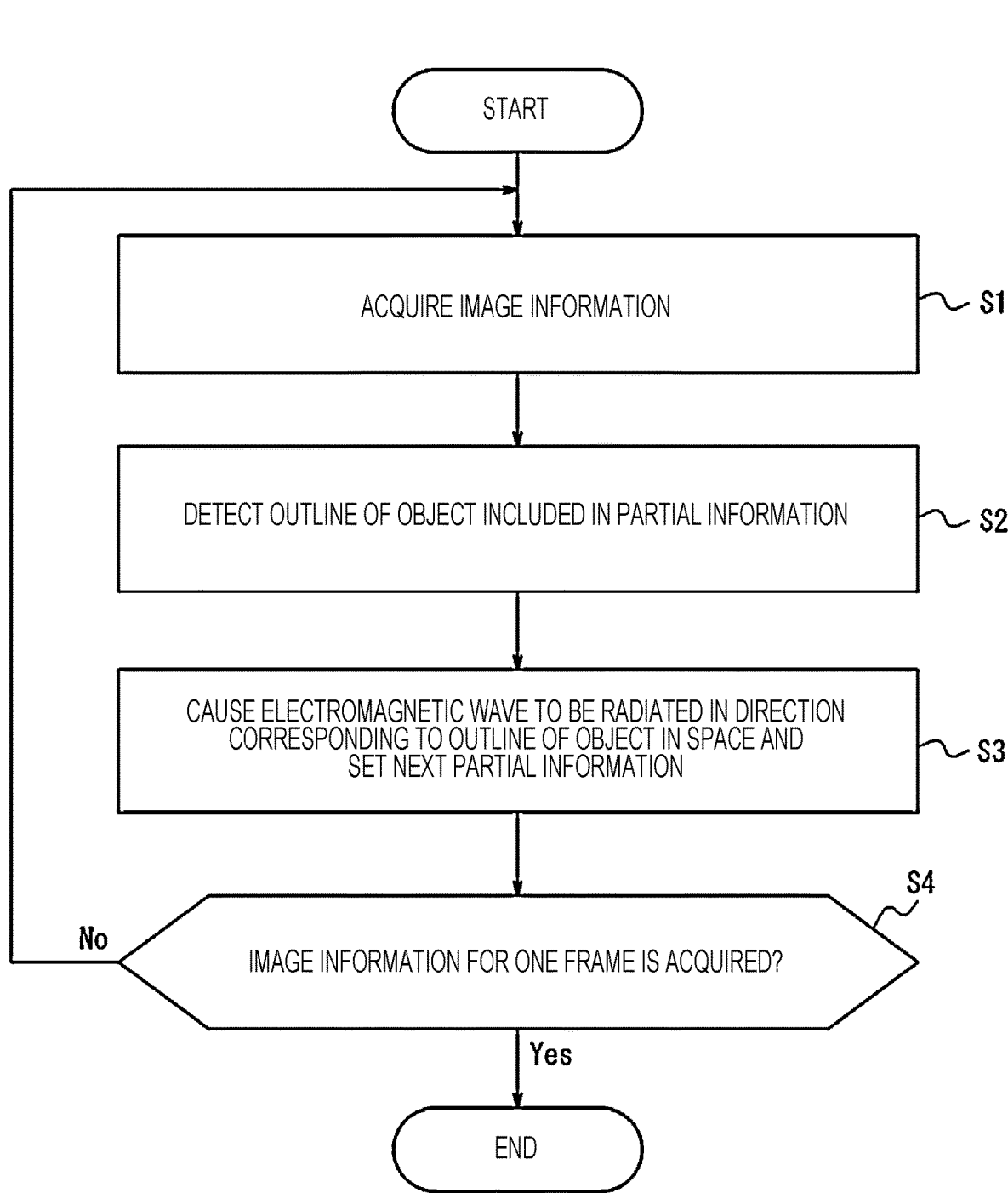
FIG. 8 is a flowchart illustrating processing that is performed by a control unit.

In the present embodiment, the control unit 14 of the electromagnetic-wave detection apparatus 10 performs electromagnetic wave detection for one frame in accordance with, for example, the flowchart illustrated in FIG. 8.

The image-information acquisition unit 141 of the control unit 14 acquires image information of the space in which the object ob is present from the first detection unit 20 (step S1). The image-information acquisition unit 141 of the control unit 14 acquires the image information in units of partial information rather than the entire frame.

The outline detection unit 142 of the control unit 14 detects the outline of the object ob included in the partial information output from the image-information acquisition unit 141 (step S2).

The radiation control unit 143 of the control unit 14 causes the radiation system 111 to radiate an electromagnetic wave in a direction corresponding to the outline of the object ob in the space. At the same time, the control unit 14 sets the next partial information (step S3). In the setting of the next partial information, for example, when control is performed such that the radiation system 111 radiates an electromagnetic wave on the basis of the first partial information 51, a parameter (as a specific example, a variable specifying a line position) in the control unit 14 is changed so that the next second partial information 52 can be acquired.

If the control unit 14 acquires image information for one frame (Yes in step S4), a series of processing operations is terminated. If the control unit 14 has not yet acquired image information for one frame (No in step S4), the process returns to the processing in step S1.

As described above, in the present embodiment, the electromagnetic-wave detection apparatus 10 having the above-described configuration radiates an electromagnetic wave in a direction corresponding to the outline of the object ob in a space. Thus, the electromagnetic-wave detection apparatus 10 can reliably radiate an electromagnetic wave to a position where the object ob is present without increasing the resolution of electromagnetic wave detection. Therefore, the difference between the timing of image acquisition and the timing of electromagnetic wave detection can be reduced.

It is preferable that the electromagnetic-wave detection apparatus 10 acquire the first partial information 51, radiate an electromagnetic wave in a direction toward an outline position on the basis of the first outline information 61 obtained from the first partial information 51, and acquire the second partial information 52. The electromagnetic-wave detection apparatus 10 performs such concurrent processing, so that the difference between the timing of image acquisition and the timing of electromagnetic wave detection can be further reduced. In other words, the difference between the timing at which an image of the object ob is acquired and the timing at which a distance to the object ob is measured can be further reduced.

In the present exemplary embodiment, although an electromagnetic wave is radiated in a direction corresponding to the outline of the object ob, in the case where the outline of the object ob cannot be detected from partial information or in the case where the number of detected outline portions is less than the upper limit, an electromagnetic wave may also be radiated in a direction corresponding to another position where no outline has not been detected as long as the number of detected outline portions is not more than the upper limit. In this case, the electromagnetic-wave detection apparatus 10 may radiate electromagnetic waves in such a manner that, for example, the electromagnetic waves are radiated so as to be evenly spaced.

(Variations)

Although the present disclosure has been described with reference to the drawings and on the basis of the embodiment, it is to be noted that variations and various corrections can be easily made by those skilled in the art on the basis of the present disclosure. Therefore, it is to be noted that such variations and corrections included in the scope of the present disclosure.

In the above-described embodiment, the electromagnetic-wave detection apparatus 10 employs the Direct ToF method for directly measuring the period from when a laser beam is radiated until the laser beam returns and generates distance information. However, the electromagnetic-wave detection apparatus 10 is not limited to having such a configuration. For example, the electromagnetic-wave detection apparatus 10 may employ the Flash ToF method, in which an electromagnetic wave is radiated at regular intervals and in which the period from when the electromagnetic wave is radiated until the electromagnetic wave returns is indirectly measured by using the phase difference between the radiated electromagnetic wave and the returned electromagnetic wave, and generate distance information. Alternatively, the electromagnetic-wave detection apparatus 10 may employ another ToF method such as, for example, the phased ToF method and generate distance information.

In the above-described embodiment, although the switching unit 18 can switch the travelling direction of an electromagnetic wave that is incident on the action surface as between two directions, the switching unit 18 may switch the travelling direction of an electromagnetic wave between three or more directions instead of two directions.

In the above-described embodiment, in the switching unit 18, the first state is the first reflection state in which an electromagnetic wave that is incident on the action surface as is reflected in the third direction d3, and the second state is the second reflection state in which an electromagnetic wave that is incident on the action surface as is reflected in the fourth direction d4. However, each of these states may be another state.

Figure 9:
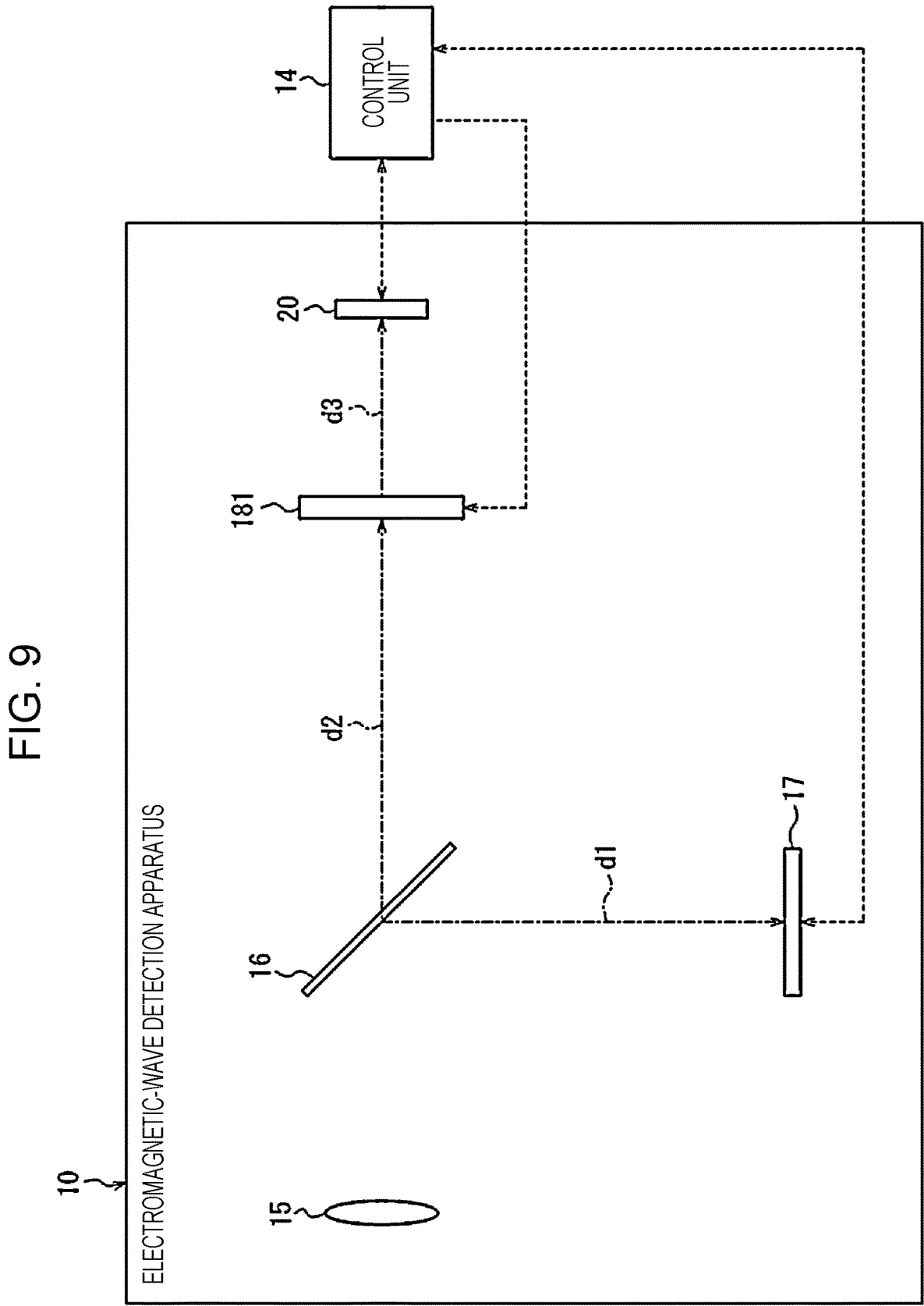
FIG. 9 is a diagram illustrating a schematic configuration of a variation of the electromagnetic-wave detection apparatus.

For example, as illustrated in FIG. 9, the first state may be a transmission state in which an electromagnetic wave that is incident on the action surface as is allowed to pass through the action surface as so as to travel in the third direction d3. More specifically, switching elements that are included in a switching unit 181 may each include a shutter having a reflective surface at which an electromagnetic wave is reflected in the fourth direction d4. In the switching unit 181 having such a configuration, the state of each of the switching elements may be switched between the transmission state, which is the first state, and the reflection state, which is the second state, by opening and closing the shutter of each of the switching elements.

An example of the switching unit 181 having such a configuration may be a switching unit that includes a MEMS shutter in which multiple shutters that are openable and closable are arranged in an array. Another example of the switching unit 181 may be a switching unit that includes a liquid crystal shutter that can switch between the reflection state in which an electromagnetic wave is reflected and the transmission state in which an electromagnetic wave is allowed to pass through in accordance with a liquid-crystal molecular orientation. In the switching unit 181 having such a configuration, the state of each of the switching elements may be switched between the transmission state, which is the first state, and the reflection state, which is the second state, by switching the liquid-crystal molecular orientation of each switching element.

In the electromagnetic-wave detection apparatus 10, the light reception system 110 may further include a second subsequent-stage optical system and a third detection unit. The second subsequent-stage optical system is disposed in the fourth direction d4 from the switching unit 18 and forms an image of the object ob. The third detection unit is disposed on a path of an electromagnetic wave that is caused to travel in the fourth direction d4 by the switching unit 18 and then travels through the second subsequent-stage optical system and detects an electromagnetic wave that has travelled in the fourth direction d4.

In the above-described embodiment, in the electromagnetic-wave detection apparatus 10, the second detection unit 17 is a passive sensor, and the first detection unit 20 is an active sensor. However, the electromagnetic-wave detection apparatus 10 is not limited to having such a configuration. For example, in the electromagnetic-wave detection apparatus 10, an advantageous effect similar to that of the above-described embodiment can be obtained both in the case where the second detection unit 17 and the first detection unit 20 are active sensors and in the case where the second detection unit 17 and the first detection unit 20 are passive sensors.

In the present embodiment, the control unit 14 includes a calculation unit 145. In the present embodiment, the calculation unit 145 measures a distance to the object ob, so that the electromagnetic-wave detection apparatus 10 has a function of serving as a distance-measurement apparatus. Here, the electromagnetic-wave detection apparatus 10 is not limited to being configured to measure a distance. For example, the electromagnetic-wave detection apparatus 10 may detect the presence of the object ob, which is an obstacle on a road, and may give a warning. In this case, the control unit 14 does not need to include the calculation unit 145. The calculation unit 145 may be provided separately from the control unit 14 instead of being included in the control unit 14 the control unit 14.

Although a representative example has been described in the above embodiment, it is obvious to those skilled in the art that many changes and substitutions can be made within the gist and the scope of the present disclosure. Thus, the present disclosure shall not be considered to be limited to the above-described embodiment, and variations and various changes can be made without departing from the scope of the claims. For example, some of the configuration blocks illustrated in one of the configuration diagrams of the embodiment can be combined into a single configuration block, or one of the configuration blocks may be divided into multiple configuration blocks.

Although the means for solving problems according to the present disclosure have been described above as apparatuses, the present disclosure can also be implemented as an aspect including these. The present disclosure can also be implemented as a method, a program, and a storage medium recording a program, which are substantially corresponding to these, and it shall be understood that these are also included within the scope of the present disclosure.

REFERENCE SIGNS 10 electromagnetic-wave detection apparatus
12 radiation unit
13 deflection unit
14 control unit
15 incident unit
16 split unit
17 second detection unit
18, 181 switching unit
19 first subsequent-stage optical system
20 first detection unit
21 calculation unit
50 captured image
51 first partial information
52 second partial information
53 third partial information
60 outline image
61 first outline information
62 second outline information
63 third outline information
110 light reception system
111 radiation system
141 image-information acquisition unit
142 outline detection unit
143 radiation control unit
144 light-reception control unit
145 calculation unit
as action surface
d1, d2, d3, d4 first direction, second direction, third direction, fourth direction
ob object
The invention claimed is:

1. An electromagnetic-wave detection apparatus comprising:
a controller configured to
aquire image information of a space in which an object is present; and
detect an outline of the object based on the image information;
a light irradiator configured to radiate an electromagnetic wave into the space, the controller being configured to control the light irradiator such that the light irradiator radiates the electromagnetic wave in a direction corresponding to the outline of the object in the space; and
a first detector configured to detect a reflected wave that is the electromagnetic wave reflected by the object.

2. The electromagnetic-wave detection apparatus according to claim 1,
wherein the controller is configured to control directions of the electromagnetic wave to not be radiated in a direction corresponding to a portion that is not the outline of the object.

3. The electromagnetic-wave detection apparatus according to claim 1,
wherein, when a number of outlines of the object exceeds an upper limit that is determined based on a period from when the light irradiator radiates the electromagnetic wave until the first detector detects the reflected wave, the controller is configured to cause the electromagnetic wave to be radiated in directions corresponding to some of the outlines that have higher priorities, a number of the higher-priority outlines being not more than the upper limit.

4. The electromagnetic-wave detection apparatus according to claim 3,
wherein the priorities are set in such a manner that the outline of the object closest to a center of an image of the space has a highest priority.

5. The electromagnetic-wave detection apparatus according to claim 1,
wherein the controller is configured to acquire first partial information that is image information of a portion of the space and second partial information that is different from the first partial information and that is image information of another portion of the space,
wherein the controller is further configured to detect, based on the first partial information, a first outline that includes at least one of the outlines of the object and then detect, based on the second partial information, a second outline that includes at least one of the outlines of the object, and
wherein the controller is configured to cause the electromagnetic wave to be radiated in a direction corresponding to the first outline in the space and then cause the electromagnetic wave to be radiated in a direction corresponding to the second outline in the space.

6. The electromagnetic-wave detection apparatus according to claim 5,
wherein the controller is configured to acquire the second partial information while the light irradiator radiates the electromagnetic wave in the direction corresponding to the first outline.

7. The electromagnetic-wave detection apparatus according to claim 1, further comprising:
a splitter configured to split electromagnetic waves including the reflected wave into the electromagnetic wave that travels in a first direction and the electromagnetic wave that travels in a second direction; and
a second detector configured to detect the electromagnetic wave that has travelled in the first direction,
wherein the controller is configured to acquire image information of the space based on detection information obtained by the second detector.

8. The electromagnetic-wave detection apparatus according to claim 7, further comprising:
a switch that includes multiple switching elements, the state of each of the switching elements being switchable between a first state in which the switching element causes the electromagnetic wave that has travelled in the second direction to travel in a third direction and a second state in which the switching element causes the electromagnetic wave to travel in a fourth direction,
wherein the controller is configured to switch the state of each of the multiple switching elements to the first state or the second state in accordance with a radiation direction of the electromagnetic wave output by the light irradiator or an irradiation position of the electromagnetic wave,
wherein the splitter causes the reflected wave to travel in the second direction, and
wherein the first detector is disposed at a position at which the first detector is capable of detecting the electromagnetic wave that travels in the third direction.

9. The electromagnetic-wave detection apparatus according to claim 1, wherein an optical axis of light for acquiring image information of the object at a predetermined position and an optical axis the reflected wave that is emitted from the predetermined position and detected by the first detector coincide with each other.

10. A distance-measurement apparatus comprising:

a controller configured to acquire image information of a space in which an object is present; and detect an outline of the object based on the image information;

a light irradiator configured to radiate an electromagnetic wave into the space, the controller being configured to control the light irradiator such that the light irradiator radiates the electromagnetic wave in a direction corresponding to the outline of the object in the space; and a first detector configured to detect a reflected wave that is the electromagnetic wave reflected by the object, wherein the controller is configured to calculate a distance to the object based on detection information obtained by the first detector.

* * * * *